US011592297B2

(12) United States Patent
Viswanathan

(10) Patent No.: US 11,592,297 B2
(45) Date of Patent: Feb. 28, 2023

(54) METHOD AND APPARATUS FOR UPDATING MAPS USING GRADIENT THRESHOLDING

(71) Applicant: HERE Global B.V., Eindhoven (NL)

(72) Inventor: Anirudh Viswanathan, Berkeley, CA (US)

(73) Assignee: Here Global B.V., Eindhoven (NL)

( * ) Notice: Subject to any disclaimer, the term of this patent is extended or adjusted under 35 U.S.C. 154(b) by 985 days.

(21) Appl. No.: 16/227,953

(22) Filed: Dec. 20, 2018

(65) Prior Publication Data

US 2020/0200542 A1    Jun. 25, 2020

(51) Int. Cl.
| | | |
|---|---|---|
| *G01C 21/30* | (2006.01) | |
| *G06T 7/73* | (2017.01) | |
| *G06N 3/04* | (2006.01) | |
| *G06N 3/08* | (2006.01) | |
| *G06V 10/75* | (2022.01) | |
| *G06V 20/56* | (2022.01) | |
| *G06N 3/088* | (2023.01) | |

(52) U.S. Cl.
CPC ............... *G01C 21/30* (2013.01); *G06N 3/04* (2013.01); *G06N 3/088* (2013.01); *G06T 7/74* (2017.01); *G06V 10/751* (2022.01); *G06V 20/56* (2022.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,953,838 B2 * | 2/2015 | Chen | G06V 20/56 |
| | | | 701/450 |
| 9,183,465 B2 | 11/2015 | Omer et al. | |
| | (Continued) | | |

FOREIGN PATENT DOCUMENTS

WO    WO 2018/03 8722 A1    3/2018

OTHER PUBLICATIONS

Abukhait, J. J., *A Discriminative Imaging-Based Framework for Road Sign Condition Assessment Using Local Features and SVM Classifiers*, Dissertation, Western Michigan University (Jun. 2012) 131 pages.

(Continued)

*Primary Examiner* — Lail A Kleinman
(74) *Attorney, Agent, or Firm* — Alston & Bird LLP

(57) ABSTRACT

Various methods are provided for facilitating map update to an environment map using gradient thresholding. One example method may include detecting an observed feature associated with a first feature decay and generating an interpolated feature that approximates the observed feature associated with a second decay. The method also includes determining a gradient difference between the interpolated feature and a stored map feature. The stored map feature represents an encoding of the observed feature associated with a third decay associated with an environment map. The method also includes determining a relationship between the gradient difference and a feature gradient update threshold, and, based upon the relationship, updating the environment map by at least replacing the map feature representation associated with the environment map with the approximated feature representation.

20 Claims, 5 Drawing Sheets

(56) References Cited

U.S. PATENT DOCUMENTS

| | | | |
|---|---|---|---|
| 9,389,084 B1 | 7/2016 | Chen et al. | |
| 11,024,099 B1* | 6/2021 | Little | G06Q 50/163 |
| 2018/0189581 A1* | 7/2018 | Turcot | G06N 3/0454 |
| 2020/0309538 A1* | 10/2020 | Gonsa | G08G 1/0112 |

OTHER PUBLICATIONS

Kousuke, Y. et al., *Use of Generative Adversarial Network for Cross-Domain Change Detection*, [online] [retrieved Apr. 29, 2019], Retrieved via the Internet: <https://pdfs.semanticscholar.org/a13d/ac9255dd738932f463a8f462c11419f072db.pdf>. (Dec. 24, 2017) 6 pages.

Ramirez, J.R., *Revision of Geographic Data: A Framework* [online] [retrieved Apr. 29, 2019], Retrieved via the Internet: <http://www.isprs.org/proceedings/XXXII/part4/ramirez74>.pdf (1998) 7 pages.

* cited by examiner

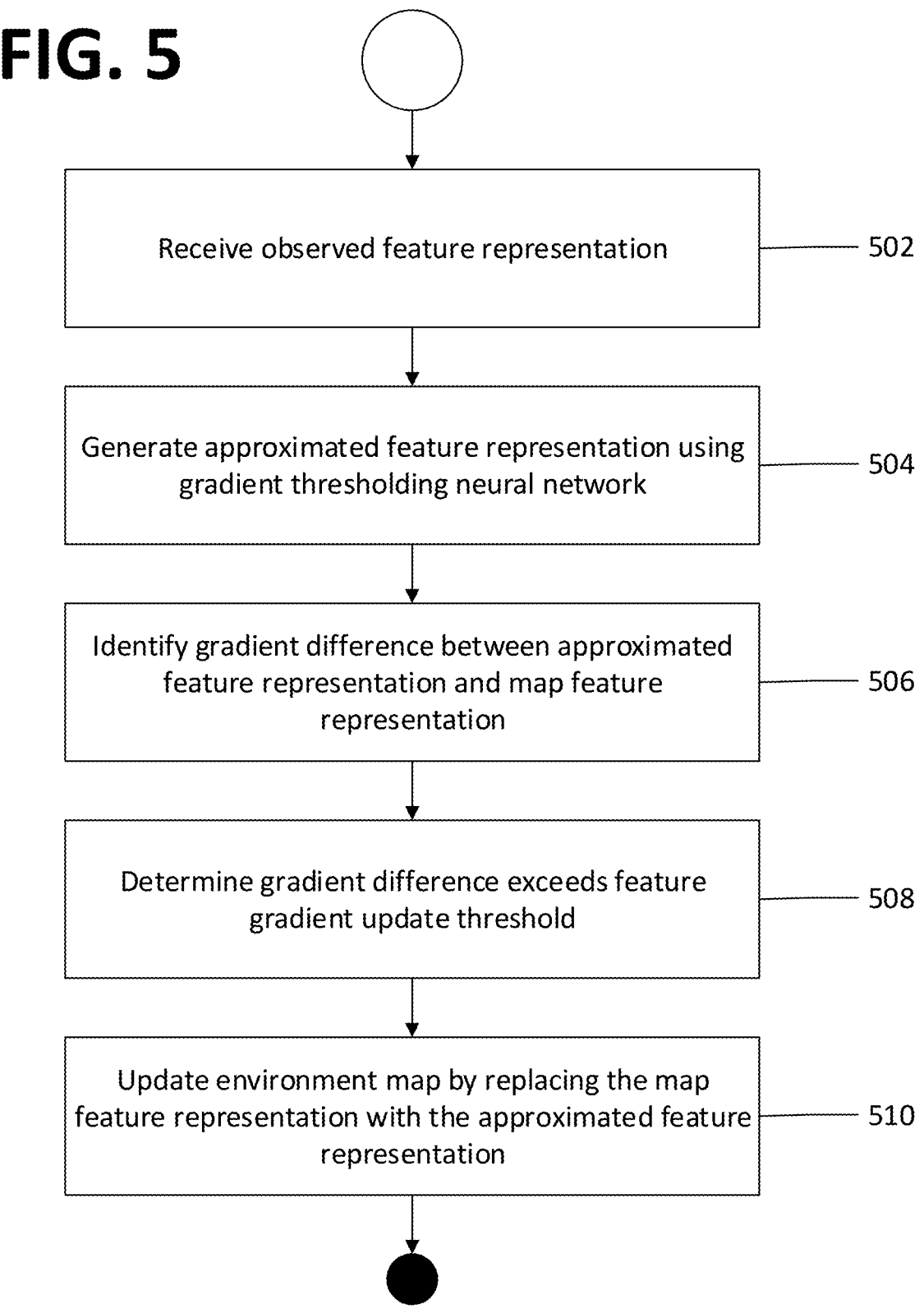

METHOD AND APPARATUS FOR UPDATING MAPS USING GRADIENT THRESHOLDING

TECHNOLOGICAL FIELD

Embodiments of the present invention relate generally to a method, apparatus, and computer program product for healing an environment map, more specifically, for facilitating map updates through a neural network associated with a gradient-thresholding scheme.

BACKGROUND

To function properly, various applications, for example autonomous vehicle navigation and control, require accurate environment maps. Environments are constantly changing and subjected to feature decay, and thus environment features may appear visually distinct from their corresponding map versions. To trigger a map update, a change in an environment feature must be identified as severe enough to require the map update.

BRIEF SUMMARY

A method, apparatus, and computer program product are therefore provided according to an example embodiment of the present invention for map healing, and more specifically, for facilitating map updates using a trained neural network via a gradient-thresholding scheme. That is, some embodiments of the present invention increase the efficiency with which maps are updated by reducing or eliminating a number of human operators who are used for performing re-parametrization of each reported significant environment observation change by implementing a map healing process utilizing a specially trained neural network and gradient-thresholding.

An example embodiment includes a method for updating an environment map using gradient thresholding. The example method includes receiving an observed feature representation, where the observed feature representation includes an observed feature associated with a first feature decay. The example method also includes generating, using a gradient thresholding neural network, an approximated feature representation. In some embodiments of the example method the approximated feature representation approximates the observed feature associated with a second feature decay. The example method also includes identifying a gradient difference between the approximated feature representation and a map feature representation, where the map feature representation represents an encoding of the observed feature associated with a third feature decay associated with an environment map. The example method also includes determining a relationship between the gradient difference and a feature gradient update threshold. The method also includes, based upon the relationship, updating the environment map by at least replacing the map feature representation associated with the environment map with the approximated feature representation.

In some embodiments of the example method, the method also includes determining a vehicle position and registering the vehicle position with the environment map by aligning an observed feature set with a stored map feature set, where the observed feature set comprises at least the observed feature and where the stored map feature set comprises at least the stored map feature representation, and wherein the stored map feature set is associated with the environment map.

In some embodiments of the example method, the method also includes identifying the map feature representation based on the registered vehicle position. In some embodiments of the example method, the second feature decay associated with the approximated feature decay includes an interpolated feature decay between the first feature decay and the third feature decay.

In some embodiments of the example method, the method also includes determining the feature gradient update threshold. In some embodiments, the gradient thresholding neural network comprises a variational auto-encoder.

In some embodiments of the example method, determining the relationship includes determining whether the gradient difference exceeds the feature gradient update threshold, and updating the environment map comprises updating the environment map in an instance in which the gradient difference exceeds the feature gradient update threshold.

An example embodiment includes an apparatus comprising at least one processor and at least one non-transitory memory that stores computer program code instructions. The computer program code instructions, when executed, by the at least one processor for example, are configured to cause the apparatus to receive an observed feature representation, where the observed feature representation includes an observed feature associated with a first feature decay. The example apparatus is further caused to generate, using a gradient thresholding neural network, an approximated feature representation, where the approximated feature representation approximates the observed feature associated with a second feature decay. The example apparatus is further caused to identify a gradient difference between the approximated feature representation and a map feature representation, where the map feature representation represents an encoding of the observed feature associated with a third feature decay associated with an environment map. The example apparatus is further caused to determine a relationship between the gradient difference and a feature gradient update threshold. The example apparatus is further caused to, based upon the relationship, update the environment map by at least replacing the map feature representation associated with the environment map with the approximated feature representation.

In some embodiments of the example apparatus, the computer code instructions are further configured to cause the apparatus to determine a vehicle position and register the vehicle position with the environment map by aligning an observed feature set with a stored map feature set, where the observed feature set comprises at least the observed feature and where the stored map feature set includes at least the stored map feature representation, and wherein the stored map feature set is associated with the environment map.

In some embodiments of the example apparatus, the computer code instructions are further configured to cause the apparatus to identify the map feature representation based on the registered vehicle position. In some embodiments of the example apparatus, the second feature decay associated with the approximated feature decay includes an interpolated feature decay between the first feature decay and the third feature decay.

In some embodiments of the example apparatus, the computer code instructions are further configured to, when executed, cause the apparatus to determine the feature gradient update threshold. In some embodiments of the example apparatus, the gradient thresholding neural network comprises a variational auto-encoder.

In some embodiments of the example apparatus, the computer code instructions configured to cause the apparatus to determine the relationship includes computer code instructions that, when executed, cause the apparatus to determine whether the gradient difference exceeds the feature gradient update threshold. Additionally, in some embodiments of the example apparatus, the computer code instructions configured to cause the apparatus to update the environment map comprises computer code instructions that, when executed, cause the apparatus to update the environment map in an instance in which the gradient difference exceeds the feature gradient update threshold.

Another example embodiment includes a computer program product including at least one non-transitory computer-readable storage medium having computer-executable program code instructions therein. The computer-executable program code instructions are configured for receiving an observed feature representation, wherein the observed feature representation includes an observed feature associated with a first feature decay. The example computer program product also includes program code configured for generating, using a gradient thresholding neural network, an approximated feature representation, where the approximated feature representation approximates the observed feature associated with a second feature decay. The example computer program product also includes program code instructions for identifying a gradient difference between the approximated feature representation and a map feature representation, where the map feature representation represents an encoding of the observed feature associated with a third feature decay associated with an environment map. The example computer program product includes program code instructions for determining a relationship between the gradient difference and a feature gradient update threshold. The example computer program product also includes program code instructions for, based upon the relationship, updating the environment map by at least replacing the map feature representation associated with the environment map with the approximated feature representation.

In some embodiments of the example computer program product, the computer program product also includes program code instructions for determining a vehicle position and registering the vehicle position with the environment map by aligning an observed feature set with a stored map feature set, where the observed feature set comprises at least the observed feature, and where the stored map feature set comprises at least the stored map feature representation, and where the stored map feature set is associated with the environment map.

In some embodiments of the example computer program product, the computer program product also includes program code instructions for identifying the map feature representation based on the registered vehicle position. In some embodiments of the example computer program product, the second feature decay associated with the approximated feature decay includes an interpolated feature decay between the first feature decay and the third feature decay.

In some embodiments of the example computer program product, the gradient thresholding neural network includes a variational auto-encoder. In some embodiments of the example computer program product, the program code instructions for determining the relationship includes program code instructions for determining whether the gradient difference exceeds the feature gradient update threshold, and the program code instructions for updating the environment map includes program code instructions for updating the environment map in an instance in which the gradient difference exceeds the feature gradient update threshold.

In yet another example embodiment, an apparatus is provided for updating an environment map using gradient thresholding that includes means for receiving an observed feature representation, where the observed feature representation includes an observed feature associated with a first feature decay. The example apparatus also includes means for generating, using a gradient thresholding neural network, an approximated feature representation. In some embodiments, the approximated feature representation approximates the observed feature associated with a second feature decay. The example apparatus also includes means for identifying a gradient difference between the approximated feature representation and a map feature representation, where the map feature representation represents an encoding of the observed feature associated with a third feature decay associated with an environment map. The example apparatus also includes means for determining a relationship between the gradient difference and a feature gradient update threshold. The apparatus also includes, based upon the relationship, means for updating the environment map by at least replacing the map feature representation associated with the environment map with the approximated feature representation.

In some embodiments, the apparatus also includes means for determining a vehicle position and means for registering the vehicle position with the environment map by aligning an observed feature set with a stored map feature set, where the observed feature set comprises at least the observed feature and where the stored map feature set comprises at least the stored map feature representation, and wherein the stored map feature set is associated with the environment map.

In some embodiments, the apparatus also includes means for identifying the map feature representation based on the registered vehicle position. The second feature decay associated with the approximated feature decay may include an interpolated feature decay between the first feature decay and the third feature decay.

In some embodiments, the apparatus also includes means for determining the feature gradient update threshold. In some embodiments, the gradient thresholding neural network comprises a variational auto-encoder.

In some embodiments, the means for determining the relationship includes means for determining whether the gradient difference exceeds the feature gradient update threshold, and the means for updating the environment map comprises means for updating the environment map in an instance in which the gradient difference exceeds the feature gradient update threshold.

BRIEF DESCRIPTION OF THE DRAWINGS

Figure 1:
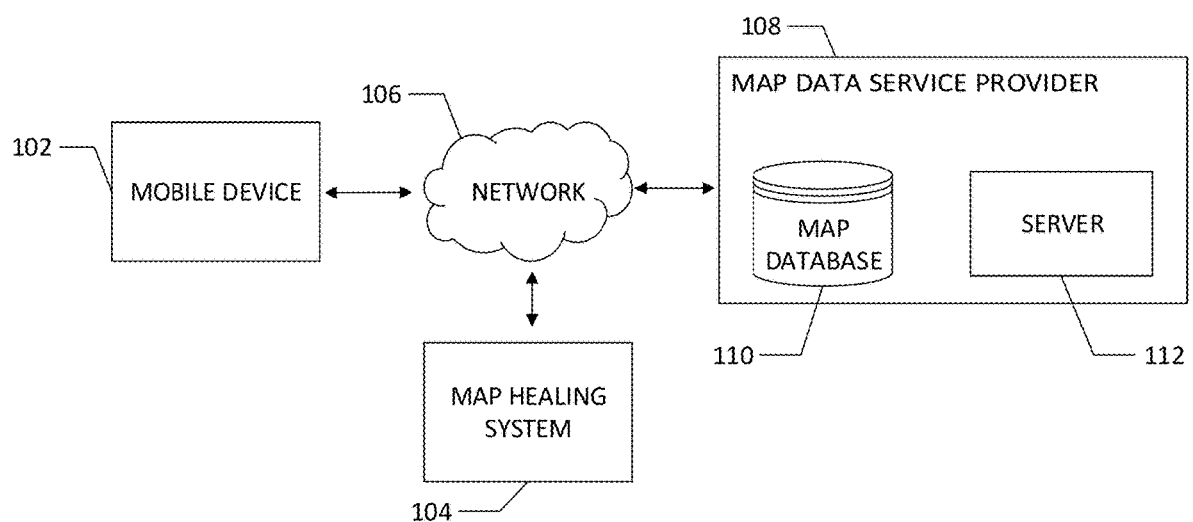
Figure 2:
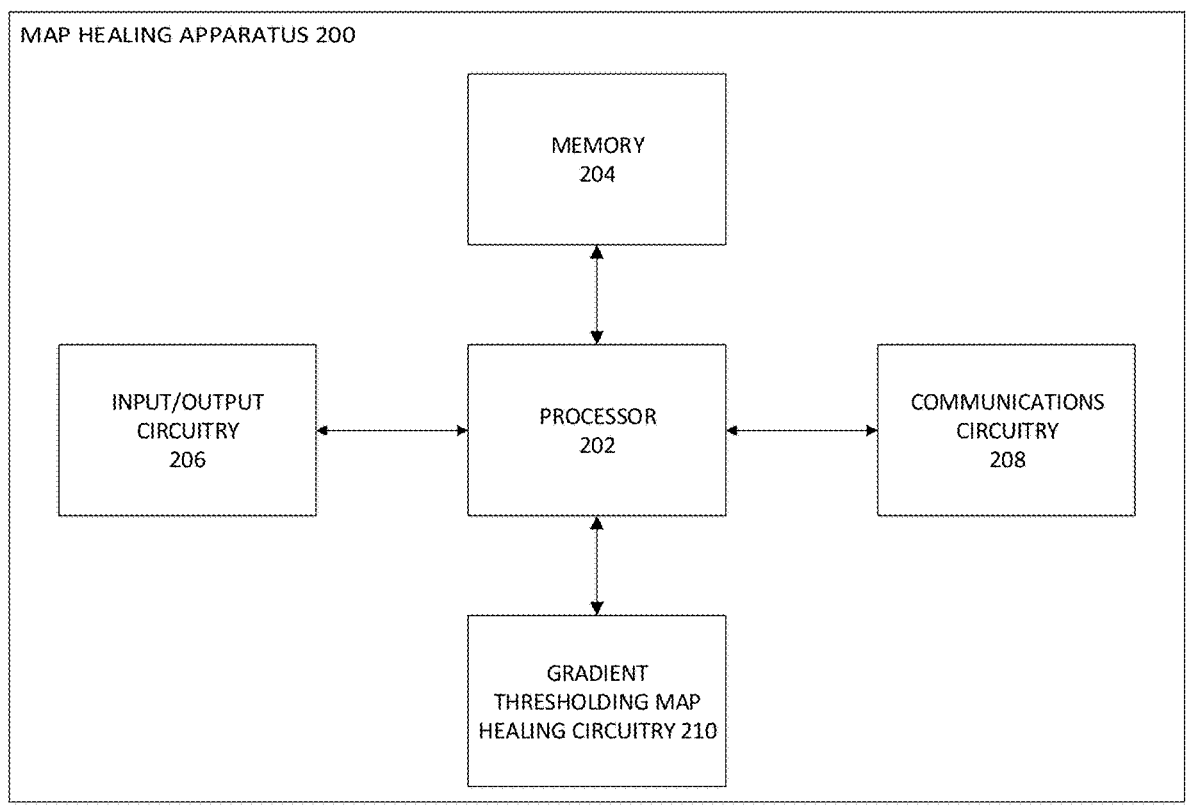
Figure 3:
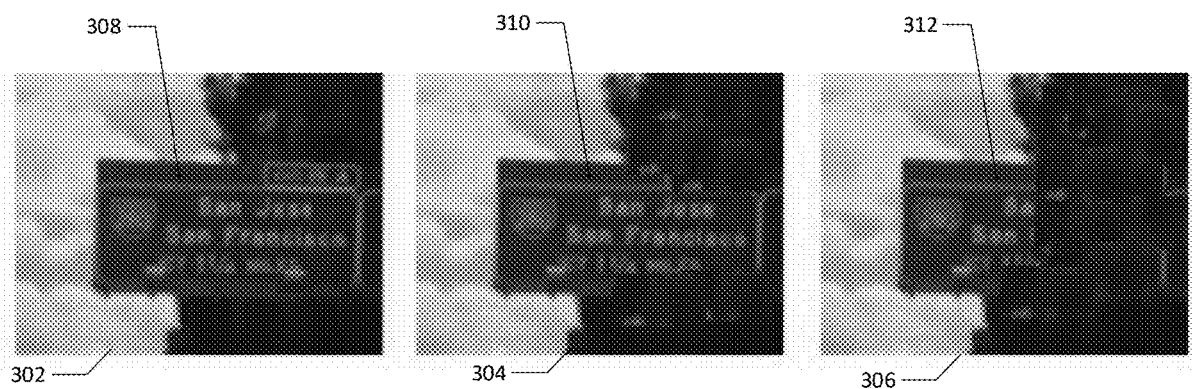
Figure 4:
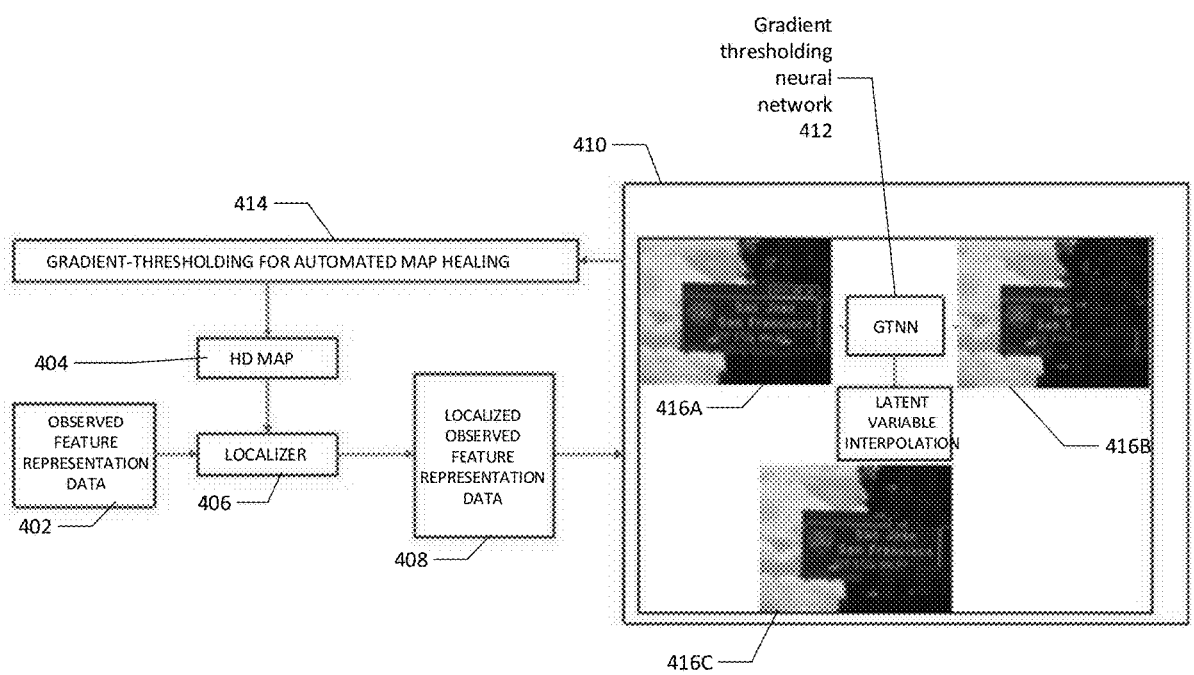

Having thus described embodiments of the invention in general terms, reference will now be made to the accompanying drawings, which are not necessarily drawn to scale, and wherein:

FIG. 1 is a block diagram of a system for map healing using gradient thresholding in which an example embodiment of the present invention may operate;

FIG. 2 is a block diagram of an apparatus according to an example embodiment of the present invention;

FIG. 3 depicts a feature space decay for a single, sample feature in accordance with an example embodiment of the present invention;

FIG. 4 illustrates a visualization of an example embodiment described herein; and FIG. 5 illustrates a flowchart of a method in accordance with an example embodiment of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data", "content", "information", and similar terms may be used interchangeably to refer to data capable of being captured, transmitted, received, displayed, and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device, or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to another computing device or it may be sent indirectly via one or more intermediary computing devices, such as, for example, one or more servers, relays, routers, network access points, base stations, and/or the like.

Overview

Many applications utilize environment maps to operate. For example, autonomous vehicles often rely on environment maps that encode the environment to localize and determine the position of a vehicle (or group of vehicles). These maps are often high-definition ("HD") maps of the environment. Environment maps store encoded versions of environment features, which allows the elements of the map to be compared with observed features. For example, an autonomous vehicle may observe environment features in real-time, from the environment surrounding a vehicle or a group of collection vehicles, utilizing one or more sensors. These observed features are then compared to environment features in the environment map. The comparison allows the vehicle, through a localization system for example, to determine the vehicle's local position, and furthermore allows the vehicle, or a sub-system therein, to perform decision-making steps, such as steering a certain way to position the vehicle in the manner intended.

Various embodiments of the disclosure relate to healing, or otherwise updating, an archival environment map. Specifically, the disclosure relates to utilizing a gradient thresholding scheme to automatically define the magnitude of a change in the environment, and trigger a corresponding map updating, e.g., healing, step. In an example embodiment, a localized position of a vehicle is registered to an environment map, for example an HD map. During this process, observed feature representations are captured using one or more sensors located on the vehicle. The observed features within the observed feature representations are detected, and aligned with map feature observations stored in map representations in the environment map. For example, in a particular embodiment, one or more sensors associated with one or more capture vehicles capture an observed feature representation set, which includes at least one observed feature representation. In some embodiments, the captured observed feature representation set includes a plurality of environment feature representations (e.g., a combination of captured lane markers, exit signs, traffic lights, or the like). Each feature in the observed feature representation set may be aligned with a corresponding map feature representation during registration to determine a localized position in a corresponding environment map. Once registration is complete, using a real-time localizer, the map healing query is performed in the cloud.

The incoming observation stream is used to train a gradient thresholding neural network. In a particular example, the gradient thresholding neural network is a variational auto-encoder that, using the observed feature representation as input, outputs a standardized feature representation, which includes an approximated environment feature that approximates the stored map feature in a corresponding stored map feature representation. A gradient magnitude is determined during the encoding process, and this gradient magnitude is recorded. The gradient magnitude is then compared to the standard gradient set used to encode an identity function of the observed feature representation. The identity function refers to the gradient function that represents no change in the observed feature representation.

During training, the last known gradient threshold is then compared to the current gradient threshold set. If the magnitude of the gradients is larger, for example, a map healing step is triggered for the corresponding environment map feature representation. The current map feature representation is then replaced by the output approximated feature representation. By replacing the current map feature with the approximated feature representation output by the gradient thresholding neural network, the magnitude of the last known gradients is implicitly stored by the trained gradient thresholding neural network. Advantageously, a system or implementation of the trained gradient thresholding neural network then can be utilized to update map feature representations stored in an archival environment map without manual input or the use of pre-defined heuristics. Thus, map healing utilizing the trained gradient thresholding neural network is more robust, scalable, and efficient upon deployment.

Definitions

The terms "environment feature" or "feature" refer to a visual environmental indicator for use in navigating, controlling, or otherwise utilizing an autonomous vehicle. Examples of environment features include, but are not limited to, lane markers, sign posts, stop signs, crosswalks, yield signs, and the like.

The term "feature decay" refers to degradation or other visual effects that affect the appearance, detectability or interpretability of an environment feature between two distinct times at which the environment feature is observed/captured. Examples of feature decay are fading of an environment feature due to use (for example, paint of a lane line marker decaying due to contact with vehicles, fading of an environment feature due to weather or weathering (for example, paint of a lane line marker decaying due to snow or rain effects), obscuring of an environment feature (for example, new foliage on a tree branch blocking a traffic sign), or the like. The term "feature decay description" refers to a phrase, indicator, or value used to describe the effects of a particular feature decay. In some embodiments, a feature decay description is any string of words entered by a human to describe a feature decay, for example "lane paint weathered more on the left side of the lane line." In some embodiments, a feature decay description is constructed from one or more sets of predefined words. For example, in a particular embodiment, a feature decay description is constructed from a set of words describing feature decay severity, a set of words describing feature decay location, and a set of words describing feature decay type. An example set of words describing feature decay severity is "none", "minimal", "light", "moderate", "heavy", and "severe".

In some embodiments, a feature decay is associated with a "feature decay severity". The terms "feature decay severity level" or "severity level" refer to a description of visual discernibility of a corresponding environment feature or portion of an environment feature. In an example embodiment, a lane marker is severely decayed when almost, or entirely, imperceptible. In an example embodiment, a lane marker is minimally/not decayed when freshly painted.

In some embodiments, a feature decay is associated with a "feature decay location". The terms "feature decay location" or "decay location" refer to a description of a portion, section, and/or area of an environment feature affected by a particular feature decay. In an example circumstance, a single lane marker is affected by two feature decays, for example a severe feature decay on the left side and a minimal feature decay on the right side. In an example embodiment, a feature decay location of "left side" is associated with a feature decay severity of "severe", and a feature decay location of "right side" is associated with a feature decay severity of "minimal".

In some embodiments, a feature decay is associated with a "feature decay type". The terms "feature decay type" or "decay type" refer to a description of a visual effect of a feature decay on a corresponding environment feature. In a particular example, a feature decay type may be "obscured by foliage" when foliage of a tree have grown and obscure an environment feature, for example a sign. In another example, a feature decay type is "worn paint", or a similar description, when paint has decayed and is no longer visible.

The term "sensor" refers to a hardware or software component or system configured to capture one or more representations of an environment that includes one or more environment features. Examples of sensors include, but are not limited to, cameras, Light Detection and Ranging (LiDAR) system, radar, and the like. In some embodiments, a sensor outputs representation data that represents a particular representation of the environment captured by the sensor. In some embodiments, the environment feature representation includes one or more environment features.

The term "observed feature representation" refers to a particular capture of an environment by a sensor, wherein the particular capture includes an observed environment feature ("observed feature") associated with an observed feature decay. In some example embodiments, one or more sensors capture observed feature representations in real-time. In some embodiments, an observed feature representation is associated with significant feature decay, such that the environment feature included in the representation is barely visible or barely interpretable. For example, an example observed feature representation that is associated with severe feature decay includes an exit sign where a half of the exit sign is obscured by foliage. Data representing an observed feature representation is referred to as "observed feature representation data."

The term "map feature representation" refers to a particular capture of an environment by a sensor during map construction, wherein the particular capture includes a map environment feature ("map feature") associated with a map feature decay. In some embodiments, a map representation includes an environment feature that is associated with minimal feature decay. For example, an example map feature representation including an exit sign may be captured during map construction, wherein the exit sign is fully unobscured. In some embodiments, a map representation includes an environment feature that is associated with significant feature decay. For example, an example map feature representation including an exit sign may be captured during map construction, wherein a half of the exit sign is obscured, such as by foliage. Data representing a map feature representation is referred to as "map feature representation data."

The term "approximated feature representation" refers to an environment representation, generated utilizing a gradient thresholding neural network with an observed feature representation as input, that includes an environment feature with an associated approximated feature decay. In an example embodiment, the approximated feature representation includes the environment feature associated with an approximated feature decay that is a best interpolation between an observed feature decay associated with an observed feature representation, and a map feature decay associated with a map feature representation. In some embodiments, each of (1) the standardized feature representation, (2) the observed feature representation that the standardized feature representation is based on, and (3) the map feature representation being approximated, each is associated with its own feature decay. For example, in an example embodiment, the approximated feature representation includes the environment feature associated with an approximated feature decay that is interpolated between an observed feature decay associated with an observed feature representation, and a map feature decay associated with a map feature representation. In some embodiments, the map feature representation and standardized feature representation are associated with the same feature decay. In some embodiments, a gradient thresholding neural network is trained to generate a standardized feature representation by transforming an observed feature representation, such as by applying a learned transformation function. Data representing a standardized feature representation is referred to as "standardized feature representation data."

As a non-limiting example, a trained gradient thresholding neural network is trained to interpolate exit signs. The trained gradient thresholding neural network transforms an observed feature representation including an exit sign associated with a feature decay of none (e.g., the exit sign is completely visible) into a standardized feature representation including an exit sign with minimal feature decay (e.g., an exit sign with foliage covering a top corner portion of the exit sign including an exit number, and a bottom corner portion containing a light and portion of a letter on the exit sign) that approximates a map feature representation including an exit sign associated with significant feature decay (e.g., an exit sign with foliage covering more than half of the exit sign).

Accordingly, the term "environment feature representation" refers generally to any map feature representation, or observed feature representation, or approximated feature representation.

The term "environment map" refers to a set of stored map feature representations, such that the set of stored map feature representations represent a real-world environment. In some embodiments, a particular feature decay is associated with each stored environment feature representation in the set of stored map feature representations. In some embodiments, feature representations stored in an environment map are accessible for comparison with observed feature representations to be used in vehicle localization to determine an accurate position of a vehicle. An example environment map is a high-definition ("HD") map.

The term "localized position" refers to an identified position of a device, a vehicle, a group of devices, or group of capture vehicles associated with one or more environment maps. In some embodiments, a localized position is determined using a localization process utilizing a comparison function. For example, in some embodiments, a standardized feature representation based on an observed feature representation is compared with a map feature representation stored in an environment map, such that a corresponding region in the environment map where the two are deemed a match by the comparison function corresponds to the localized position of a vehicle, or group of vehicles, configured to capture the observed feature representation utilizing a particular sensor. Data representing a particular localized position is referred to as "localized position data."

Technical Underpinnings and Implementation of Example Embodiments

While a particular encoded map environment feature representation stored in an environment map will remain the same without an update from the system, real-time observed feature representations often appear visually distinct from their corresponding representations in the environment map. Feature observations of environment features can be affected by "feature decay" that affects the visual appearance of the environment feature as it is observed. Feature decay may cause significant variations to the appearance of a feature, or merely slight changes. However, feature decay may compound over time, especially when effectuated by multiple forces (e.g., weather, use, and the like). Alternatively, weather effects or lighting effects may cause a given feature observation to appear different despite maintaining the same condition. As a particular non-limiting example, an exit sign may be blocked by foliage in a first representation (e.g., one stored in an environment map), and completely unblocked when observed in real-time several weeks or months later.

Regardless of the reason, an observed environment feature that visually differs from its corresponding representation in an environment map may cause significant problems. For example, registering a localized position of an autonomous vehicle requires that observed feature representations be aligned with stored map feature representations to identify a localized position in accordance with a particular archival environment map. However, localized positions can be inaccurate, or undeterminable, because an observed environment feature differs from its corresponding encoded map representation. Registering an incorrect position may lead to incorrect decision making, inefficient behaviors (e.g., overly cautious driving actions), or other undesirable and potentially dangerous results. Registering an accurate position is advantageous in ensuring an autonomous vehicle functions as intended.

To avoid such problems, environment maps must be updated. However, to perform a map update, a corresponding system must first determine that the environment has changed in a material manner, or otherwise has changed in a manner that deems a map update necessary. These changes can be detected by a human operator. In a particular example, a human operator can define a magnitude of change at which a map update is triggered. For example, a human operator may analyze regions where a vehicle subsystem, such as a localization system, reports highly inaccurate feature positions. A human operator may then manually intervene to update the environment map using the observed feature, or a more recent observed feature. Alternatively, in another particular example, a predefined heuristic may be utilized to define a magnitude of change between an observed feature and a map feature.

However, utilizing human operators for identifying changes to an environment map, and/or updating a map feature in an environment map, is not robust and is not scalable. Utilizing human operators is neither robust nor sufficient for large-scale or crowd-sourced data capture scenarios. Using pre-defined heuristics, however, remains inefficient and, in some circumstances, inaccurate.

Embodiments utilize a gradient thresholding neural network to trigger and perform map healing, e.g., updating. A gradient thresholding neural network approximates a stored map feature representation based on an input observed feature representation. In some embodiments, an apparatus embodies the gradient thresholding neural network. In some embodiments, a subsystem that embodies a gradient thresholding neural network is integrated into a larger system for managing observed features and corresponding environment maps.

In some embodiments, a gradient thresholding neural network outputs an approximated feature representation that is an interpolation between an observed feature representation and a map feature representation. As a non-limiting example, if a particular map feature representation includes an exit sign fully obscured by foliage on a right side of the exit sign, and a particular observed feature representation includes the same exit sign but not obscured by foliage, an approximated feature representation includes foliage covering a small portion of the top right and bottom right portions of the exit sign. In this particular non-limiting example, the feature decay associated with the approximated feature representation is an interpolation between a feature space for mapping the observed feature representation and the map feature representation.

In utilizing the gradient thresholding neural network, a particular gradient threshold may be received, determined, or otherwise defined. A gradient magnitude may be determined between an approximated feature representation generated by a gradient thresholding neural network and a corresponding map feature representation. In an example system, if the gradient magnitude satisfies, such as exceeds, the gradient threshold, the method and apparatus triggers a map healing, e.g., updating, step. For example, the method and apparatus may update the map feature representation stored in the environment map with the approximated feature representation.

Utilizing the gradient thresholding neural network allows fully-autonomous map healing. A gradient thresholding neural network allows for map healing of any environment feature type (e.g., exit signs, exit signs, lane markers, crosswalks, and the like) without human operators or predefined heuristics, and thus is both robust and scalable. Additionally, by performing autonomously, use of the gradient thresholding neural network is efficient. Furthermore, a system, apparatus, or component that embodies a gradient thresholding neural network removes human subjectivity from determining when a map update is necessary, and how the map should be updated.

System Architecture

Methods, apparatuses, and computer program products of the present invention may be embodied by any of a variety of devices. For example, the method, apparatus, and computer program product of an example embodiment may be embodied by a network device, such as a server or other entity, configured to communicate with one or more devices, such as one or more mobile vehicles, systems, or user devices. Additionally or alternatively, the method, apparatus, and computer program product of an example embodiment may be embodied by one or more computing devices including those that execute under the direction of software modules configured to carry out all or some of the operations disclosed herein.

In this regard, FIG. 1 is a block diagram showing an example system in which embodiments of the present invention may operate. An example system includes mobile device 102, map-healing system 104, and map data service provider 108. Each of the mobile device 102, map healing system 104, and map data service provider 108 may be in communication with at least one of the other elements illustrated in FIG. 1 via a network 106, which may be in any form of wireless or partially wireless network. Additional, different, or fewer components are provided in alternative systems. For example, a plurality of capture devices similar to the mobile device 102 may connect with the network 106. The map data service provider 108 may be a cloud-based service provider and/or may operate via a hosting server that receives, processes, and provides data to other elements in the system. Similarly, map healing system 104 may also be a cloud-based service provider, and/or operate via a hosting server that performs some or all of the operations described herein. In some embodiments, map healing system 104 is one sub-system in a larger system with multiple other sub-systems (not depicted), for example a localization sub-system that registers localized positions of one or more mobile devices, such as mobile device 102. Alternatively, map healing system 104 may include one or more sub-systems, such as the aforementioned localization sub-system (not depicted).

Mobile device 102 may be embodied by, associated with, or carried by an autonomous vehicle including a plurality of sensors, such that the autonomous vehicle is configured to capture representations of a surrounding environment utilizing the plurality of sensors. Mobile device 102 may alternatively be a mobile user device, smart phone, or the like, configured to perform mapping capabilities. In such an example system, mobile device 102 may include one or a plurality of sensors configured to capture a surrounding environment. In some embodiments, the plurality of sensors are configured to capture observed feature representations and transmit observed feature representation data for transformation in real-time. For example, in a particular system, one or more sensors capture an observed feature representation and transmit observed feature representation data that represents the particular observed feature representation to the map healing system 104 through a communications interface of the mobile device 102.

The map data service provider 108 includes map database 110 that includes one or more stored environment maps. In some embodiments, map database 110 may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider 108, and may be accessed, for example, by the map data service provider server 112. By way of example, the map data service provider 108 may collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by one or more vehicles, such as by one or more mobile device 102, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 102, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database. In alternate embodiments, a client side map database may represent a compiled navigation database that may be used in or with end user devices (e.g., mobile device 102) to provide navigation and/or map-related functions. For example, the map database 110 may be used with the mobile device 102 to provide an end user with navigation features. In such a case, the map database 110 can be downloaded or stored on the end user device which can access the map database 110 through a wireless or wired connection, such as via server 112 and/or the network 106 for example.

In one embodiment, as noted above, the mobile device 102 or end user device can embody the apparatus 200 of FIG. 2, which, in turn, may be embodied by or otherwise be in communication with an Advanced Driver Assistance System (ADAS) which may include an infotainment in-vehicle system or an in-vehicle navigation system of a vehicle, such as an autonomous or semiautonomous vehicle, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 102 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to road ways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by more than one map data service provider 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

In an example embodiment, the map database 110 at least stores an environment map, such as a HD map, which includes map feature representations captured at a first time, such as during construction of the environment map. In an example embodiment in which map database 110 stores an HD environment map that includes map feature representations captured at a first time, each map feature representation may be associated with a feature decay.

In some embodiments, map-healing system 104 is a sub-system of mobile device 102, while in other embodiments, map-healing system 104 is a sub-system of map data service provider 108. Alternatively, map-healing system 104 may comprise sub-modules of both mobile device 102 and map data service provider 108.

The map healing system may be embodied by one or more computing systems, such as apparatus 200 depicted in FIG. 2. As illustrated in FIG. 2, the apparatus 200 may include a processor 202, a memory 204, input/output circuitry 206, communications circuitry 208, and gradient thresholding map healing circuitry 210. The apparatus 200 may be configured to execute the operations described above with respect to FIG. 1 and below with respect to FIGS. 4 and 5. Although these components 202-210 are described with respect to the performance of various functions, it should be understood that the particular implementations necessarily include the use of particular hardware. It should also be understood that certain of these components 202-210 may include similar or common hardware. For example, two modules/circuitry may both leverage use of the same processor, network interface, storage medium, or the like to perform their associated functions, such that duplicate hardware is not required for each module. The use of the terms "module" and "circuitry" as used herein with respect to components of the apparatus therefore includes particular hardware configured to perform the functions associated with the particular module described herein.

Of course, the terms "module" and "circuitry" should be understood broadly to include hardware. In some embodiments, however, circuitry/module may also include software for configuring the hardware. For example, in some embodiments, "module" and/or "circuitry" may include processing circuitry, storage media, network interfaces, input/output devices, and the like. In some embodiments, other elements of the apparatus 200 may provide or supplement the functionality of particular module(s). For example, the processor 202 may provide processing functionality, the memory 204 may provide storage functionality, the communications circuitry 208 may provide network interface functionality, and the like.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing module" and/or "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may optionally include input/output circuitry 206 that may, in turn, be in communication with processor 202 to provide output to the user and, in some embodiments, to receive an indication from the user. The input/output circuitry 206 may comprise user interface associated with a hardware and/or software display. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device, module, or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). In an example embodiment, communications circuitry 208 is leveraged to receive observed feature representation data from a mobile device, such as an autonomous vehicle, wherein the observed feature representation data represents an observed feature representation captured by one or more sensors on or associated with the mobile device.

Gradient thresholding map healing circuitry 210 includes hardware and/or software components specially configured to embody a gradient thresholding neural network. In some embodiments, gradient thresholding map healing circuitry 210 is specially configured to perform one or more of the operations described herein with respect to FIGS. 4 and/or 5. For example, gradient thresholding map healing circuitry 210 may, together with at least processor 202, memory 204, and communications circuitry 208, receive an observed feature representation (or data representing an observed feature representation), generate an approximated feature representation, and determine if a map update of a corresponding environment map is needed. In some embodiments, gradient thresholding map healing circuitry 210 receives observed feature representation data, such as through communications from sensors 210A-210N via processor 202, to utilize in generating an approximated feature representation. Gradient thresholding map healing circuitry 210 may be configured to embody a gradient thresholding neural network trained utilizing additional or different hardware not depicted. Additionally, gradient thresholding map healing circuitry 210 may utilize one or more other modules or circuitry, such as communications circuitry 208, to receive and/or transmit data. For example, in an example embodiment, gradient thresholding map healing circuitry 210 communicates with communications circuitry 208 via processor 202 to trigger and/or perform a map update of an environment map stored on another device, for example map data service provider 108 depicted in FIG. 1.

Gradient thresholding map healing circuitry 210 may, for instance, be embodied by or otherwise utilize a processing module, such as processor 202, to perform the above operations, and may further utilize any of the other modules, such as communications circuitry 208, for their purposes as described herein to perform the above operations. It should be appreciated that, in some embodiments, the gradient thresholding map healing circuitry 210 may include a separate processor, specially configured field programmable gate array (FPGA), or application specific interface circuit (ASIC) to perform the above functions.

The apparatus 200 and, more specifically, the processor 202 and/or the gradient thresholding map healing circuitry 210 may operate under control of computer program instructions, which may be stored in memory 204. As will be appreciated, any such computer program instructions and/or other type of code may be loaded onto a computer, processor, or other programmable apparatus' circuitry, such as the processor 202 and/or the gradient thresholding map healing circuitry 210, to produce a machine, such that the computer, processor, or other programmable circuitry, such as the processor 202 and/or the gradient thresholding map healing circuitry 210, that executes the code on the machine creates the means for implementing various functions, including those described herein.

As described above and as will be appreciated based on this disclosure, embodiments of the present invention may be configured as a method, apparatus, computer program product, autonomous vehicle system, and the like. Accordingly, the apparatus of an example embodiment may comprise various means including entirely of hardware or any combination of software and hardware. Furthermore, the apparatus of an example embodiment may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example System Data Flow

FIG. 3 illustrates an example embodiment of feature space decay for an example feature. As depicted in FIG. 3, an environment feature representation 302 is captured by a sensor, such as an image sensor, of an environment of the sensor. The environment of the sensor includes exit signs located proximate the sensor (such as above the sensor when the sensor is looking upwards towards the sky), and the detected environment feature is an exit sign, specifically exit sign 308. The exit sign 308 is, or appears, completely visible. No foliage is obstructing any relevant portion of the sign, and all parts of the sign are readable and interpretable. Accordingly, environment feature representation 302 may be associated with a feature decay indicating the environment feature, exit sign 308, is "not obscured," for example.

However, as time progresses, the exit sign may become partially obscured by the surrounding foliage. Environment feature representation 304 illustrates a partial decay of the featured exit sign, specifically exit sign 310. As illustrated, exit sign 310 is partially obscured by the surrounding foliage. Accordingly, environment feature representation 304 may be associated with a feature decay indicating the environment feature, exit sign 310, is "partially obscured," for example.

Environment feature representation 306 illustrates a significant decay of the featured exit sign, specifically exit sign 312. Accordingly, environment feature representation 306 may be associated with a feature decay indicating the environment feature, exit sign 312, is "significantly obscured", for example. In some embodiments, the decay may be associated with a particular location, for example "significantly obscured on the right side."

While each of the environment feature representations 302-306 correspond to the same location in physical space, and similarly would correspond to the same localized position according to a particular environment map, each of the environment feature representations 302-306 corresponds to a representation captured, such as by a sensor, at a different time, and thus a different feature decay applies to each depicted environment feature representation 302-306. Using a trained gradient thresholding neural network, each of the representations is represented in a different feature space location. Accordingly, spaces between the corresponding latent space of each environment feature representation may be related. For example, interpolating between the location of environment feature representation 302 and the location of environment feature representation 306 may approximate the foliage growth at different stages on the right side of the sign. In a specific example, environment feature representation 304 may be located in the corresponding feature space between the location representing environment feature representation 302 and environment feature representation 306, but may be closer to the location for environment feature representation 302 because the foliage coverage is not significant.

Each map feature representation stored in an environment may be associated with any of the feature decays depicted in FIG. 3, or other feature decays not depicted. For example, an environment map may include one or more map feature representations of exit signs that are associated with a feature decay of "not obscured", as well as one or more map feature representations of exit signs that are associated with a feature decay of "partially obscured" or "significantly obscured" Similarly, a particular feature representation may include an environment feature that is obscured slightly more than environment feature 310, but not as obscured as environment feature 312, and may be associated with a corresponding description (e.g., "moderately obscured" or "moderately obscured on the right side").

An overall context that defines the conditions of an environment feature representation may also be associated with a particular environment feature representation. An example overall context includes a weather descriptor and a feature decay associated with a particular environment feature representation. For example, if the environment feature representations 302-306 were captured on a sunny summer day, environment feature representation 302 may be associated with an overall context of "sunny summer conditions, not obscured", environment feature representation 304 may be associated with an overall context of "sunny summer conditions, partially obscured on the right side," and environment feature representation 306 may be associated with an overall context of "sunny summer conditions, significantly obscured on the right side." Accordingly, an overall context associated with an environment feature representation may be utilized to compare environment feature representations, or transform an observed feature representation associated with a first overall context into an approximated feature representation associated with a second overall context.

In some embodiments, feature decays represent a particular point in an associated feature space. For example, the feature decay associated with exit sign 308 (not obscured) may define, such as by being associated with, a particular location in the feature space representing obscuring of signs. Similarly, the feature decay associated with exit sign 312 (completely obscured on the right side) may define a particular location in the feature space representing obscuring of signs. Accordingly, feature decay may be interpolated between two points in the feature space. For example, the feature decay associated with exit sign 310 (somewhat obscured on the top right corner and bottom right corner) may define, e.g., be associated with, a particular location between the feature space locations for the feature decays associated with exit signs 308 and 312. Accordingly, if not captured by a sensor, the feature decay associated with exit sign 310 may result from interpolating slightly away from the feature space location defining the feature decay for exit sign 308 towards the feature decay for exit sign 312, based upon the relative feature space locations for exit signs 308 and 312 relative to the feature space location of exit sign 310.

Additionally, it should be appreciated that the three depicted environment feature representations in FIG. 3 are merely examples. In fact, feature decays different than the those depicted in FIG. 3 can be determined by interpolating between the depicted environment feature representations. Accordingly, it should be understood that a particular environment feature may be visually affected by feature decay in a myriad of ways, such that a particular feature decay (e.g., "partially obscured on the right side") refers to a portion of the myriad of visual appearances. Thus, the illustrated example environment feature representations and corresponding feature decay descriptions are merely examples, and should not be taken to limit the spirit and scope of the disclosure.

Turning now to FIG. 4, a visualization is provided of an example data flow in accordance with an embodiment described herein is illustrated. As depicted, an observed feature representation data 402 is received. Observed feature representation data 402 may be captured by one or more corresponding sensors. In some embodiments, observed feature representation data is transmitted from one or more capture vehicle(s) to an apparatus implemented as part of a cloud server for performing map healing. In some embodiments, transmitting captured data advantageously allows capture vehicles to reduce hardware requirements by transmitting to a server to perform hardware intensive processing.

Subsequently, localizer 406 receives, e.g., accesses, an environment map, for example HD map 404, and the observed feature representation data. The localizer may utilize the observed feature representation data to determine a localized position in the HD map 404. In some embodiments, additional observed feature representations may be input and utilized by localizer 406. The localizer may identify or define a pose corresponding to the vehicle or user device that captured the observed feature representation data 402. In some embodiments, the localizer 406 implements a custom localization framework. In other embodiments, the localizer 406 implements pre-defined localization frameworks.

Localizer 406 outputs the localized observed feature representation data 408. In some embodiments, the localizer 406 is a localization system integrated into a capture vehicle. In some embodiments, the localizer 406 is associated with, or in communication with, the apparatus 200. In a particular embodiment, a capture vehicle includes sensors configured to capture one or more environment representations and identify observed feature representation data 402. Additionally, in a particular embodiment, a system of a capture vehicle is configured determine or receive the HD map 404, such as from a map database stored on a server, and input the HD map 404 and observed feature representation data 402 into a localizer sub-system of the capture vehicle. For example, a particular localization system may be integrated as part of an autonomous vehicle, and configured to communicate with one or more sensors, a decision-making system, a perception system, and/or other autonomous vehicle control and navigation systems.

The output from localizer 406, specifically localized observed feature representation data 408, is then input into an embodiment of gradient thresholding map healing module 410, embodied by the apparatus 200 in some embodiments. In some embodiments, gradient thresholding map healing module 410 may be implemented by gradient thresholding map healing circuitry 210. In some embodiments, a capture vehicle configured to output the localized observed feature representation data 408 is further configured to transmit the localized observed feature representation data 408 to a server that embodies the apparatus 200 including gradient thresholding map healing circuitry 210, or similar processing circuitry, to perform the operations identified herein and/or with respect to FIG. 5.

In the illustrated example embodiment, the localized observed feature representation data 408 represents environment feature representation 416A, which specifically includes a street sign that is not obscured. The input data is input into gradient thresholding neural network 412 of the apparatus 200, in some embodiments. Gradient thresholding neural network 412 is trained to generate an approximated feature representation based on the input data. The approximated feature representation approximates a corresponding map feature representation. As illustrated, gradient thresholding neural network 412 uses input localized observed feature representation data 408, which represents the observed feature representation 416A, to approximate the stored map feature representation 416B. Stored map feature representation 416B of this example embodiment includes an exit sign that is significantly obscured on the right side of the exit sign. For example, stored map feature representation 416B may be stored in the HD map 404. In the illustrated embodiment, the gradient thresholding neural network 412 outputs data representing approximated feature representation 416C. As illustrated, approximated feature representation 416C represents a latent variable interpolation between observed feature representation 416A and stored map feature representation 416B. Specifically, as illustrated, the exit sign included in approximated feature representation 416C is partially obscured in the top right and bottom right corners. Accordingly, the latent variable representation of the approximated feature representation 416C may exist between the latent variable representations of representations 416A and 416C. In some embodiments, gradient thresholding neural network is a trained variational auto-encoder, while in other embodiments, gradient thresholding neural network is a trained generative adversarial network.

Data representing the approximated feature representation 416C is then utilized for gradient-thresholding for automated map healing 414. In an example embodiment, the gradient magnitude between the approximated feature representation and the map feature representation may be identified. For example, gradient thresholding map healing module 410 of the apparatus 200 may calculate the gradient magnitude difference between the approximated feature representation and the map feature representation. Then, the gradient thresholding map healing module 410 may determine the relationship of the gradient difference to a feature gradient update threshold, such as by determining whether the gradient difference satisfies, such as by exceeding, the feature gradient update threshold. In some embodiments, one or more feature gradient update thresholds may be determined by a human operator. For example, for a given environment feature, a human operator may indicate a feature gradient update threshold via comparison between a first environment feature representation and a second environment feature representation. Alternatively, the feature gradient update threshold may be pre-determined by the system, such as by gradient thresholding map healing module 410, or determined in real-time. In an example embodiment, for the environment feature of exit signs, an embodiment of the system may include means, such as gradient thresholding map healing module 410, for setting a feature gradient update threshold at 50% occlusion, and for determining and/or comparing an occluded area and a visible area.

Based upon the relationship, such as if the identified gradient difference satisfies, such as by exceeding, the feature gradient update threshold, a map healing step is performed on the environment map, such as HD map 404. In an example embodiment, as part of the map healing step, the approximated feature representation replaces the stored map feature representation in the HD map 404. Thus, for a given location, the prior stored map data may be discarded. By storing the approximated feature representation in the environment map, the last known gradient set is implicitly stored. For a given environment feature representation, because the gradient is always observable given a current feature set (e.g., an environment feature and an associated feature decay, such as an exit sign and feature decay in the form of foliage growth that at least partially obscures/occludes the exit sign), the gradient information is implicit in the current data for a given environment feature representation.

FIG. 4 illustrates an exemplary data flow in accordance with a fully autonomous map healing system. Accordingly, map healing steps are triggered and performed without manually set thresholds, use of human operators, or predefined heuristics. Thus, the data flow illustrated in FIG. 4 is robust, scalable, and efficient.

As similarly described above with respect to FIG. 3, the particular environment feature representations 416A, 416B, and 416C are merely examples. In other embodiments, the observed feature representation 416a, the approximated feature representation 416C, and/or the map feature representation 416B are depicted differently, for example the same exit sign associated with a different feature decay. Accordingly, use of the depicted representations is merely an example, and such example depictions should not be taken to limit the spirit and scope of the disclosure FIG. 5 illustrates a flowchart depicting the operations performed, such as by apparatus 200, according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory, such as memory 204 of apparatus 200, and executed by a processor, such as processor 202 of the apparatus 200. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

The operations of FIG. 5 provide for environment map healing, e.g., updating, using gradient thresholding, specifically utilizing a gradient thresholding neural network. As depicted, at block 502, apparatus 200 includes means, such as the processor 202, the input/output circuitry 206, the communications circuitry 208, and/or the like, configured to receive an observed feature representation. In some embodiments, observed feature representation data representing the observed feature representation is received. In some embodiments, one or more capture vehicles transmits the observed feature representation data to the apparatus for performing the illustrated operations. In some embodiments, the observed feature representation data is received from a sensor or a plurality of sensors associated with one or more capture vehicles. In some embodiments, the observed feature representation data of an example embodiment represents raw sensor data. In other embodiments, the observed feature representation data has undergone at least one pre-processing step, such that the observed feature representation data is in a pre-processed data format. Alternatively, in some embodiments, the observed feature representation data is directly transmitted from one or more sensors in a raw data format.

At block 504, the apparatus 200 includes means, such as processor 202, the gradient thresholding map healing circuitry 210, or the like, configured to generate an approximated feature representation using a gradient thresholding neural network. The gradient thresholding neural network of the gradient thresholding map healing circuitry 210 may be trained to approximate a stored map feature corresponding to the input observed feature representation. For example, if the input observed feature representation includes a particular exit sign associated with a particular feature decay at a particular location, the corresponding map feature representation may include the same exit sign associated with a second feature decay at the same location. As a particular example, the stored map feature representation may have been captured at a first time, and the observed feature representation may have been captured at a second time. For example, if the observed feature representation includes an exit sign that is not obscured (for example environment feature representation 302), and the stored map feature includes the exit sign that is obscured (for example environment feature representation 306), the generated approximated feature representation may be interpolated between the two (for example, environment feature representation 304).

At block 506, the apparatus 200 includes means, such as the processor 202, the gradient thresholding map healing circuitry 210, or the like, configured to identify a gradient difference between the approximated feature representation and the map feature representation. For example, the gradient difference may be calculated by comparing the gradient associated with the approximated feature representation and the map feature representation. In an example embodiment, a gradient difference is output from a comparison function, such as a comparison function performed by the processor 202 or the gradient thresholding map healing circuitry 210. The gradient difference may represent the level of change between the feature decay associated with the environment feature in the map feature representation and the feature decay associated with the environment feature in the approximated feature representation.

At block 508, the apparatus 200 includes means, such as the processor 202, the gradient thresholding map healing circuitry 210, or the like, configured to determine the relationship between the gradient difference and a feature gradient update threshold. For example, the relationship that is determined may be a determination as to whether the gradient difference satisfies, such as by exceeding, the feature gradient update threshold. The feature gradient update threshold may be determined at or prior to the determination of the relationship, or may have been received prior to the determination. The gradient difference exceeding the feature gradient update threshold indicates that the environment map must be updated through a map healing step.

At block 510, the apparatus 200 includes means, such as the processor 202, the gradient thresholding map healing circuitry 210, or the like, configured, based upon the relationship, to update an environment map. Specifically, as illustrated, the environment map in which the stored map feature representation utilized to determine the gradient difference at block 506 is updated. The environment map may have been received or determined at an earlier stage. In the illustrated method, the environment map is updated by replacing the map feature representation corresponding to the observed feature representation with the approximated feature representation output by the gradient thresholding neural network at block 504 in an instance in which the gradient difference satisfies, such as by exceeding, the feature gradient update threshold.

By updating the environment map, the map is advantageously more accurately comparable to the observed feature. Localization is improved by utilizing the updated environment map. Accordingly, embodiments herein improve the decision-making of autonomous and semi-autonomous vehicles, thus advantageously improving the navigation, steering, and/or other control associated with the autonomous or semi-autonomous vehicle.

The method illustrated in FIG. 5 may be performed automatically. Accordingly, the method is robust and scalable as multiple capture devices, such as vehicles, semi-autonomous vehicles, and/or autonomous vehicles, are utilized. The method does not require human operators or reliance on re-defined heuristics. Thus, the method performs efficiently in an entirely automated system.

In some embodiments, the apparatus 200 that performs the operations illustrated by FIG. 5 may be embodied by and implemented on a mobile device, for example a capture vehicle. Alternatively, in some embodiments, the apparatus 200 that performs the operations illustrated in FIG. 5 may be embodied and implemented on a cloud server for identifying, triggering, and performing map updates. In some embodiments, the apparatus 200 may be associated, or otherwise in communication with, one or more capture vehicles including, or otherwise associated with, one or a plurality of sensors. Implementing the method and apparatus configured to perform the operations illustrated in FIG. 5 may enhance systems by allowing capture devices, such as capture vehicles, to minimize their required hardware to operate effectively.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for updating an environment map using gradient thresholding, the method comprising:
   receiving an observed feature representation, wherein the observed feature representation includes an observed feature associated with a first feature decay;
   applying the observed feature representation to a gradient thresholding neural network to generate an approximated feature representation associated with a second feature decay;
   identifying a gradient difference between the approximated feature representation and a map feature representation, wherein the map feature representation represents an encoding of the observed feature associated with a third feature decay associated with an environment map;
   determining a relationship between the gradient difference and a feature gradient update threshold; and
   based upon the relationship, automatically updating the environment map by at least replacing the map feature representation associated with the environment map with the approximated feature representation.

2. The method of claim 1 further comprising:
   determining a vehicle position; and
   registering the vehicle position with the environment map by aligning an observed feature set with a stored map feature set, wherein the observed feature set comprises at least the observed feature,
   further wherein the stored map feature set comprises at least the stored map feature representation, and wherein the stored map feature set is associated with the environment map.

3. The method of claim 2 further comprising identifying the map feature representation based on the registered vehicle position.

4. The method of claim 1, wherein the second feature decay associated with the approximated feature decay comprises an interpolated feature decay between the first feature decay and the third feature decay.

5. The method of claim 1 further comprising determining the feature gradient update threshold.

6. The method of claim 1, wherein the gradient thresholding neural network comprises a variational auto-encoder.

7. The method of claim 1, wherein determining the relationship comprises determining whether the gradient difference exceeds the feature gradient update threshold, and wherein updating the environment map comprises updating the environment map in an instance in which the gradient difference exceeds the feature gradient update threshold.

8. An apparatus for updating an environment map using gradient thresholding, the apparatus comprising at least one processor and at least one non-transitory memory including computer program code instructions stored thereon, the computer program code instructions configured to, when executed by the at least one processor, cause the apparatus to:
receive an observed feature representation, wherein the observed feature representation includes an observed feature associated with a first feature decay;
apply the observed feature representation to a gradient thresholding neural network to generate an approximated feature representation associated with a second feature decay;
identify a gradient difference between the approximated feature representation and a map feature representation, wherein the map feature representation represents an encoding of the observed feature associated with a third feature decay associated with an environment map;
determine a relationship between the gradient difference and a feature gradient update threshold; and
based upon the relationship, automatically update, via the apparatus, the environment map by at least replacing the map feature representation associated with the environment map with the approximated feature representation.

9. The apparatus of claim 8, wherein the computer code instructions are further configured to, when executed, cause the apparatus to:
determine a vehicle position; and
register the vehicle position with the environment map by aligning an observed feature set with a stored map feature set, wherein the observed feature set comprises at least the observed feature,
further wherein the stored map feature set comprises at least the stored map feature representation, and wherein the stored map feature set is associated with the environment map.

10. An apparatus of claim 8, wherein the computer code instructions are further configured to, when executed, cause the apparatus to identify the map feature representation based on the registered vehicle position.

11. The apparatus of claim 8, wherein the second feature decay associated with the approximated feature decay comprises an interpolated feature decay between the first feature decay and the third feature decay.

12. The apparatus of claim 8, wherein the computer code instructions are further configured to, when executed, cause the apparatus to determine the feature gradient update threshold.

13. The apparatus of claim 8, wherein the gradient thresholding neural network comprises a variational auto-encoder.

14. The apparatus of claim 8, wherein the computer code instructions configured to cause the apparatus to determine the relationship comprises computer code instructions that, when executed, cause the apparatus to determine whether the gradient difference exceeds the feature gradient update threshold, and wherein the computer code instructions configured to cause the apparatus to update the environment map comprises computer code instructions that, when executed, cause the apparatus to update the environment map in an instance in which the gradient difference exceeds the feature gradient update threshold.

15. A computer program product for updating an environment map using gradient thresholding, the computer program product comprising at least one non-transitory computer-readable storage medium having computer-executable program code instructions stored therein, the computer-executable program code instructions comprising program code instructions for:
receiving an observed feature representation, wherein the observed feature representation includes an observed feature associated with a first feature decay;
applying the observed feature representation to a gradient thresholding neural network to generate an approximated feature representation associated with a second feature decay;
identifying a gradient difference between the approximated feature representation and a map feature representation, wherein the map feature representation represents an encoding of the observed feature associated with a third feature decay associated with an environment map;
determining a relationship between the gradient difference and a feature gradient update threshold; and
based upon the relationship, automatically updating the environment map by at least replacing the map feature representation associated with the environment map with the approximated feature representation.

16. The computer program product of claim 15, further comprising program code instructions for:
determining a vehicle position; and
registering the vehicle position with the environment map by aligning an observed feature set with a stored map feature set, wherein the observed feature set comprises at least the observed feature,
further wherein the stored map feature set comprises at least the stored map feature representation, and wherein the stored map feature set is associated with the environment map.

17. The computer program product of claim 15, further program code instructions for identifying the map feature representation based on the registered vehicle position.

18. The computer program product of claim 15, wherein the second feature decay associated with the approximated feature decay comprises an interpolated feature decay between the first feature decay and the third feature decay.

19. The method of claim 1, wherein receiving the observed feature representation comprises:
receiving the observed feature representation from at least one sensor of a capture vehicle that captured the observed feature representation.

20. The method of claim 1, wherein the observed feature representation comprises a first observed feature representation and wherein the approximated feature representation comprises a first approximated feature representation, the method further comprising further comprising:
receiving a second observed feature representation associated with the observed feature;
applying the second observed feature representation to the gradient thresholding neural network to generate the approximated feature representation associated with a third feature decay;
identifying a second gradient difference between the second approximated feature representation and the map feature representation representing the first approximated feature representation;
determining a second relationship between the second gradient difference and the feature gradient update threshold; and
based upon the second relationship, determining whether to update the environment map by at least replacing the map feature representation associated with the environment map with the second approximated feature representation.

\* \* \* \* \*

UNITED STATES PATENT AND TRADEMARK OFFICE
CERTIFICATE OF CORRECTION

| | | |
|---|---|---|
| PATENT NO. | : 11,592,297 B2 | Page 1 of 1 |
| APPLICATION NO. | : 16/227953 | |
| DATED | : February 28, 2023 | |
| INVENTOR(S) | : Anirudh Viswanathan | |

It is certified that error appears in the above-identified patent and that said Letters Patent is hereby corrected as shown below:

In the Claims

In Column 26, Line 52, Claim 20, delete "further comprising further comprising:" and insert -- further comprising: --, therefor.

Signed and Sealed this
Seventh Day of November, 2023

*Katherine Kelly Vidal*

Katherine Kelly Vidal
*Director of the United States Patent and Trademark Office*